(12) United States Patent
Horikawa et al.

(10) Patent No.: US 8,970,742 B2
(45) Date of Patent: Mar. 3, 2015

(54) IMAGE PROCESSING APPARATUS AND METHOD CAPABLE OF PERFORMING CORRECTION PROCESS SPEEDILY AND EASILY

(75) Inventors: Yohei Horikawa, Tokyo (JP); Yuuichirou Kimijima, Yokohama (JP)

(73) Assignee: Canon Kabushiki Kaisha (JP)

( * ) Notice: Subject to any disclaimer, the term of this patent is extended or adjusted under 35 U.S.C. 154(b) by 643 days.

(21) Appl. No.: 13/275,411

(22) Filed: Oct. 18, 2011

(65) Prior Publication Data

US 2012/0099008 A1 Apr. 26, 2012

(30) Foreign Application Priority Data

Oct. 20, 2010 (JP) ................................ 2010-235649

(51) Int. Cl.
*H04N 9/64* (2006.01)
*H04N 5/217* (2011.01)
*H04N 5/367* (2011.01)

(52) U.S. Cl.
CPC ................................. *H04N 5/367* (2013.01)
USPC .......................................... 348/246; 348/241

(58) Field of Classification Search
None
See application file for complete search history.

(56) References Cited

U.S. PATENT DOCUMENTS

| | | | |
|---|---|---|---|
| 5,805,216 A * | 9/1998 | Tabei et al. | 348/246 |
| 7,327,392 B2 * | 2/2008 | Matsuyama et al. | 348/246 |
| 7,623,162 B2 * | 11/2009 | Inaba | 348/246 |
| 7,916,191 B2 | 3/2011 | Kiba et al. | |
| 2008/0278609 A1 * | 11/2008 | Otsuki | 348/247 |
| 2009/0245683 A1 * | 10/2009 | Sasaki | 382/275 |

FOREIGN PATENT DOCUMENTS

| | | |
|---|---|---|
| CN | 101115210 A | 1/2008 |
| JP | 2006094160 A | 4/2006 |
| JP | 2006324908 A | 11/2006 |

OTHER PUBLICATIONS

Chinese Office Action cited in Chinese counterpart application No. CN201110324201.3 dated Dec. 23, 2013. English translation provided.

\* cited by examiner

*Primary Examiner* — Luong T Nguyen
(74) *Attorney, Agent, or Firm* — Rossi, Kimms & McDowell LLP

(57) ABSTRACT

An image processing apparatus capable of performing a correction process by filtering speedily and easily. A digital signal processor captures image data including effective area data from within a preset range of an image pickup device and ineffective area data from outside the preset range of the image pickup device. The digital signal processor superimposes a defective pixel detection signal and an ineffective image data detection signal to thereby generate a defective pixel determination signal. When a target pixel in the image data is determined based on the defective pixel determination signal as a determined-as-defective pixel, the digital signal processor corrects the value of the target pixel using values of the image data associated with ones, which are not determined, based on the defective pixel determination signal, as the determined-as-defective pixel, of pixels around the target pixel.

7 Claims, 10 Drawing Sheets

302 INEFFECTIVE AREA DATA
303 IMAGE DATA
300 EFFECTIVE AREA DATA
301 SURROUNDING REFERENCE AREA

406 INEFFECTIVE IMAGE DATA DETECTION SIGNAL
303 IMAGE DATA
300 EFFECTIVE AREA DATA

304 CORRECTION TARGET PIXEL
305 SURROUNDING REFERENCE PIXEL

304 CORRECTION TARGET PIXEL
305 SURROUNDING REFERENCE PIXEL
500 DETERMINED-AS-DEFECTIVE PIXEL

IMAGE PROCESSING APPARATUS AND METHOD CAPABLE OF PERFORMING CORRECTION PROCESS SPEEDILY AND EASILY

BACKGROUND OF THE INVENTION

1. Field of the Invention

The present invention relates to an image processing apparatus and an image processing method which are capable of correcting image data including defective pixels caused by manufacturing of a solid-state image pickup device.

2. Description of the Related Art

A solid-state image pickup device sometimes includes a defective element which is incapable of properly reacting to incident light, due to a manufacturing process of the image pickup device. It is difficult to manufacture a solid-state image pickup device completely free from such a defective element.

To overcome this problem with a conventional apparatus using a solid-state image pickup device, there has been proposed a unit for correcting data of a defective pixel (defective pixel data) output from a defective element of the solid-state image pickup device, using a one-dimensional or two-dimensional filter (see e.g. Japanese Patent Laid-Open Publication No. 2006-324908). The unit configured to use the filter to correct the defective pixel data performs correction using pixel data obtained from normal pixels (reference pixels) around the defective pixel which have information on the same color as that of the defective pixel data.

In the unit that performs correction using the filter, however, there arise a problem that when correction is to be performed on entire image data, if a defective pixel is located at an end of the image data, some of reference pixels which are to surround the defective pixel are missing, which makes it impossible to correct the defective pixel.

To solve this problem, there has been proposed a unit in which when some of reference pixels for filtering are missing, data at the end is extrapolated to a location where the missing reference pixels should exist, whereby pseudo reference pixels are generated so as to enable the use of the filter (see e.g. Japanese Patent Laid-Open Publication No. 2006-094160).

In the conventional correction unit for use when some of reference pixels for filtering are missing, however, it is required to generate pseudo reference pixels by copying effective pixel data at the end of image data so as to make up for missing reference pixels. The operation of copying effective pixel data to generate pseudo reference pixels for missing reference pixels has to be performed by suspending the input of image data. This degrades throughput of the image processing apparatus. Further, the correction unit requires flow control for stopping image data input and a control circuit associated with the flow control, and therefore circuitry becomes complicated.

SUMMARY OF THE INVENTION

The present invention provides an image processing apparatus and an image processing method which are capable of performing a correction process by filtering speedily and easily, using data on effective reference pixels around a correction target pixel.

In a first aspect of the present invention, there is provided an image processing apparatus, comprising an acquisition unit configured to capture image data including effective area data read out from pixel output elements within a preset range of an image pickup device, and ineffective area data read out from pixel output elements outside the preset range of an image pickup device, for correction of a value of a pixel of the effective area data, wherein the image pickup device includes a defective pixel output element, a signal generation unit configured to superimpose a first signal indicative of a position of the defective pixel output element of the image pickup device and a second signal indicative of a position of each of the pixels outside the preset range of the image pickup device, to thereby generate a defective pixel determination signal indicative of a position of a determined-as-defective pixel, and a correction unit configured to be operable when a target pixel in the image data is determined as the determined-as-defective pixel based on the defective pixel determination signal, to correct a value of the target pixel in the image data, using values of the image data associated with ones of pixels positioned around the target pixel, the ones being each not determined based on the defective pixel determination signal as the determined-as-defective pixel.

In a second aspect of the present invention, there is provided a method of processing an image output from an image pickup device including a defective pixel output element, comprising capturing image data including effective area data wherein the image pickup device includes a defective pixel output element read out from pixel output elements within a preset range of the image pickup device, and ineffective area data read out from pixel output elements outside the preset range of the image pickup device, for correction of a value of a pixel of the effective area data, superimposing a first signal indicative of a position of the defective pixel output element of the image pickup device and a second signal indicative of a position of each of the pixels outside the preset range of the image pickup device, to thereby generate a defective pixel determination signal indicative of a position of a determined-as-defective pixel, and correcting, when a target pixel in the image data is determined as the determined-as-defective pixel based on the defective pixel determination signal, a value of the target pixel in the image data, using values of the image data associated with ones of pixels positioned around the target pixel, the ones being each not determined based on the defective pixel determination signal as the determined-as-defective pixel.

According to the present invention, it is possible to correct a defective pixel by filtering speedily and easily, using data on effective reference pixels around a correction target pixel.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. First, a description will be given of an image processing apparatus according to a first embodiment of the present invention. Note that illustration and description of component elements and parts of the image processing apparatus which are not directly related to the present invention will be omitted.

Figure 1:
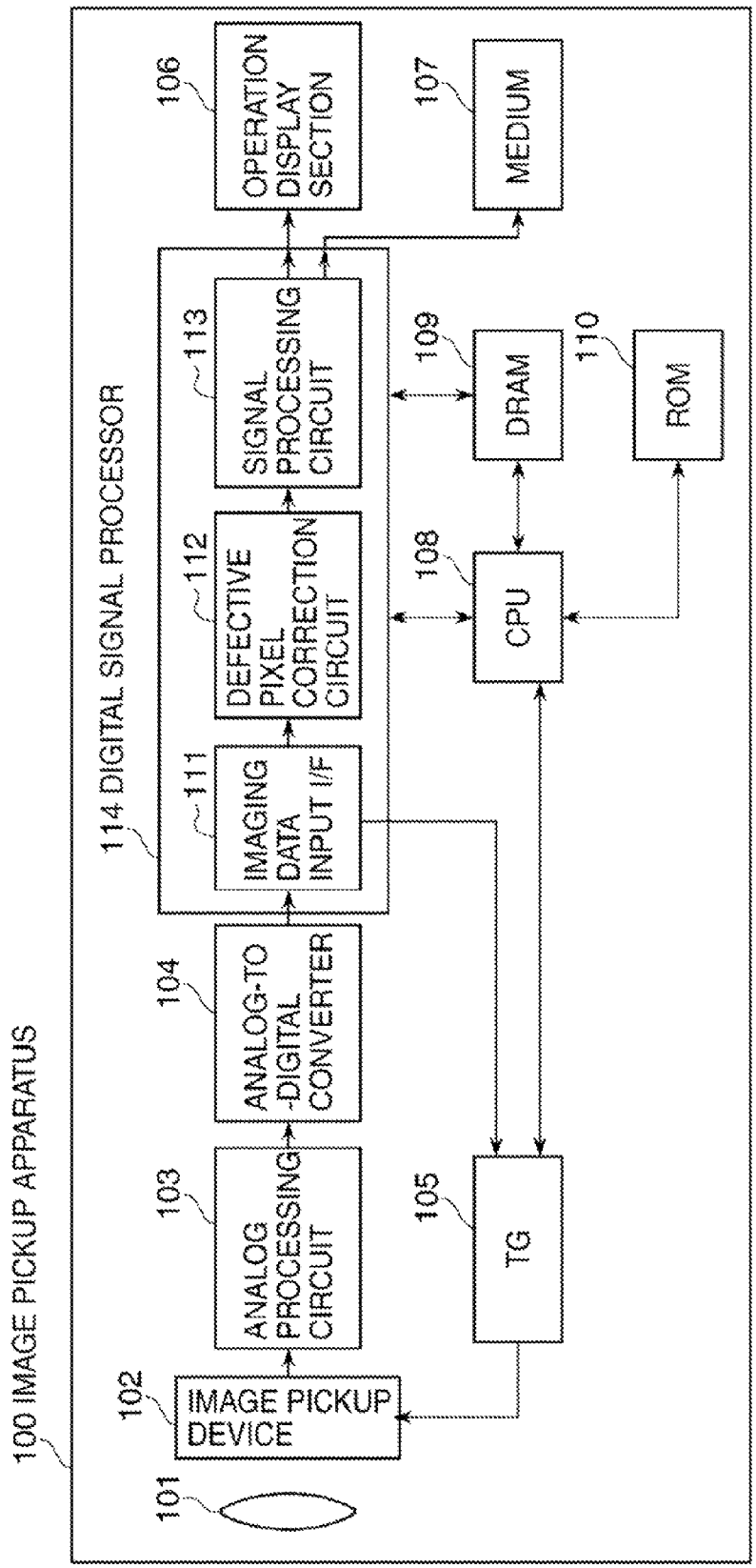
FIG. 1 is a schematic block diagram of essential parts of an image pickup apparatus according to a first embodiment of the present invention.

FIG. 1 is a block diagram of an image pickup apparatus. A reference numeral 100 denotes the main unit of the image pickup apparatus. The image pickup apparatus 100 has a function of properly correcting defective pixels generated in two-dimensional image data output from an image pickup device 102, so as to output an excellent image.

As shown in FIG. 1, the image pickup apparatus 100 causes light having passed through an optical lens 101 to form an image on the image pickup device 102. In the image pickup apparatus 100, an imaging data input interface 111 of a digital signal processor 114 outputs a synchronization signal for driving the image pickup device 102 to a timing generator (TG) 105.

The timing generator 105 drives the image pickup device 102 to output a two-dimensional image formed on the same to an analog processing circuit 103. The analog processing circuit 103 performs processing including a non-linear amplification process on the two-dimensional image and outputs the processed image to an analog-to-digital converter 104. The analog-to-digital converter 104 converts an analog signal from the analog processing circuit 103 to a digital signal and then outputs the digital signal to the imaging data input interface 111 of the digital signal processor 114.

The digital signal processor 114 reads out defective pixel data from a DRAM (storage section) 109 and performs a defective pixel correction process, a synchronization process, and a noise reduction process, on the digital signal. Then, the digital signal processor 114 converts the processed digital signal to a file compressed e.g. by JPEG. The converted digital signal is output to an operation display section 106 or a removable medium 107.

Further, the image pickup apparatus 100 is provided with a CPU 108 that not only performs various computing operations but also controls the overall operation of the apparatus. A ROM 110 is connected to the CPU 108. The ROM 110 stores data to be prefetched by the CPU 108, and outputs the data to the CPU 108 when the image pickup apparatus 100 is started. Further, the ROM 110 also stores outputs data on defective pixels corresponding to defective ones of pixel output elements, not shown, of the image pickup device 102, and outputs the data (defective pixel data) to the DRAM (storage section) 109 via the CPU 108.

The image pickup device 102 used in the image pickup apparatus 100 is formed by a two-dimensional image sensor. The image pickup device 102 comprises a photosensitive section where the pixel output elements for forming an image on a screen are arranged two-dimensionally, i.e. in a manner associated with horizontal and vertical directions of the screen, and an output amplifier for converting an electric charge generated by each of the pixel output elements to an electric signal and outputting the electric signal as an analog electric signal.

Each of the pixel output elements of the image pickup device 102 is provided with a primary color filter, and the pixel output elements are classified into pixel output elements for delivering pixels of red (R), respectively, pixel output elements for delivering pixels of green (G), respectively, and pixel output elements for delivering pixels of blue (B), respectively, for example. In the present embodiment, it is assumed that a Bayer array is employed for the primary color filter. In the image pickup device 102, there are pixel output elements having structural defects caused during a manufacturing process. The term "defective pixel output element" used here refers to a pixel output element which does not react to incident light as a normal pixel output element does, or a pixel output element which generates an abnormally large amount of dark current without any incident light. Further, the term "defective pixel" means a pixel which is output by such a defective pixel output element.

The defective pixel data stored in the ROM 110 for specifying the positions of defective pixels to be output from the respective defective pixel output elements is supplied from the manufacturer of the image pickup device 102. Alternatively, such defective pixels are discriminated during the manufacturing process of the image pickup device 102, and the defective pixel data is prepared as data specifying the positions of such defective pixels.

The analog electric signal output from the image pickup device 102 is input to the analog processing circuit 103. The analog processing circuit 103 includes a CDS (correlated double sampling) circuit, not shown, for removing noise caused by a transmission line and the like, and a non-linear amplification circuit, not shown. The analog processing circuit 103 outputs a result of processing performed on the input analog electric signal by the CDS circuit and the non-linear amplification circuit to the analog-to-digital converter 104.

The analog-to-digital converter 104 converts the analog electric signal output from the image pickup device 102 and processed by the analog processing circuit 103 to a digital electric signal (image signal), and then outputs the digital electric signal to the digital signal processor 114.

Figure 2:
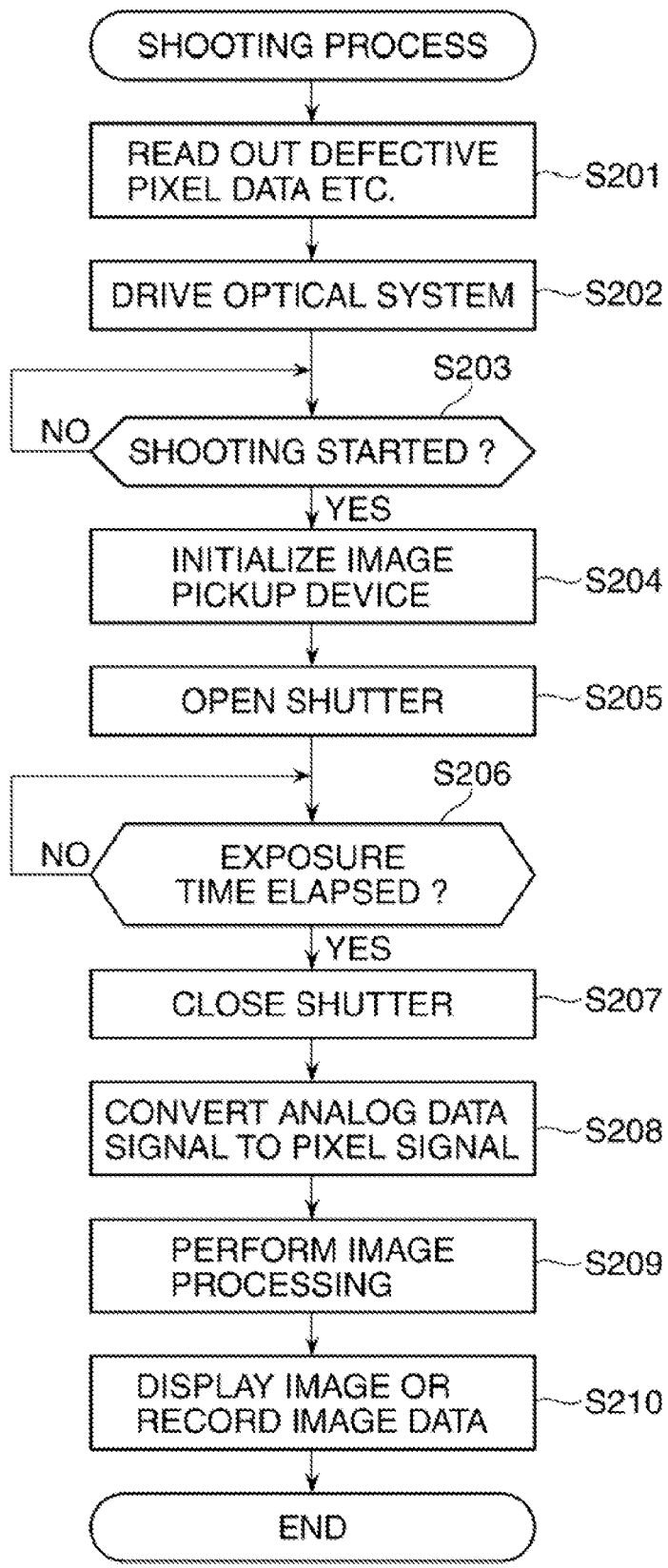
FIG. 2 is a flowchart of a shooting process executed by the image pickup apparatus according to the first embodiment.

Next, a description will be given of shooting process executed by the CPU 108 of the image pickup apparatus 100 according to the present embodiment with reference to FIG. 2.

When a user performs a shooting starting operation e.g. by turning on the power switch of the image pickup apparatus 100, the shooting process is started. Then, the CPU 108 reads out the defective pixel data from the ROM 110 and outputs the defective pixel data to the DRAM (storage section) 109. At the same time, the CPU 108 reads out an exposure time and other settings from the ROM 110 and configures operations to be performed by associated blocks of the image pickup apparatus 100 (step S201). The associated blocks correspond to all the blocks of the image pickup apparatus 100 shown in FIG. 1.

Next, the CPU 108 drives the optical lens 101 to bring an object into focus (step S202).

Then, the CPU 108 determines whether or not shooting has been started (step S203). If shooting has not been started (NO to the step S203), the CPU 108 waits until shooting is started. If shooting has been started (YES to the step S203), the process proceeds to a step S204. As a method of starting shooting, it is possible to employ a method of detecting a switching operation for starting shooting control, or a method of detecting the lapse of a predetermined time period, e.g. when a self-timer or the like is used.

Then, the CPU 108 controls the timing generator 105 to initialize the image pickup device 102. At the same time, the CPU 108 controls the imaging data input interface 111 to set an image signal output from the image pickup device 102, such that signal accumulation is enabled (step S204).

Then, the CPU 108 opens a shutter, not shown, disposed in front of the optical lens 101 and performs control such that exposure of the image pickup device 102 is started (step S205). At this time, the imaging data input interface 111 outputs a VD/HD synchronization signal or the like to the timing generator 105.

Then, the CPU 108 determines whether or not the exposure time elapsed after the shutter was opened has reached a predetermined time period set in the step S201 (step S206). If the exposure time has not reached the set predetermined time period (NO to the step S206), the CPU 108 waits until the exposure time reaches the set predetermined time period. If it is determined that the exposure time has reached the set predetermined time period (YES to the step S206), the CPU 108 closes the shutter to thereby terminate the exposure of the image pickup device 102 (step S207). Then, an analog data signal output from the image pickup device 102 is input to the analog processing circuit 103 and is subjected to signal processing. Then, the processed analog data signal is output to the analog-to-digital converter 104, wherein it is converted to a digital electric signal (pixel signal), and then the digital electric signal is output to the digital signal processor 114 (step S208).

Then, the CPU 108 controls the digital signal processor 114 to perform image processing (step S209).

Thereafter, the CPU 108 displays an image processed by the digital signal processor 114 on the operation display section 106, or records data of the image in the medium 107 (step S210), followed by terminating the present shooting process.

Next, a description will be given of the digital signal processor 114 as a digital signal processing circuit of the image pickup apparatus 100 of the present embodiment.

The digital signal processor 114 comprises the imaging data input interface 111, a defective pixel correction circuit 112, and a signal processing circuit 113.

The imaging data input interface 111 captures image data according to an output from the image pickup device 102, adds a signal (area discrimination data) indicative of whether the acquired image data is effective area data or ineffective area data to the acquired image data, and delivers the image data to the defective pixel correction circuit 112.

The defective pixel correction circuit 112 corrects defective pixels contained in the output from the image pickup device 102.

The signal processing circuit 113 performs signal processing on an output from the defective pixel correction circuit 112. In this signal processing, synchronization, noise reduction, and compression e.g. by JPEG are performed.

Next, details of the processing by the defective pixel correction circuit 112 will be described with reference to FIGS. 3A, 3B, and 3C.

Figure 3A:
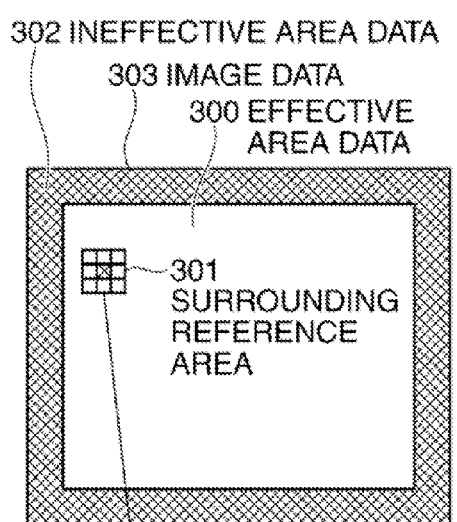
FIGS. 3A, 3B, and 3C are conceptual views useful in explaining ineffective area data and a surrounding reference area.

FIG. 3A illustrates image data output from the imaging data input interface 111. The image data 303 illustrated in FIG. 3A is two-dimensional image data. Effective area data 300 is read out from a preset range of pixel output elements set in advance to the image pickup device 102, and serves as a source of image data to be written into the medium 107.

Ineffective area data 302 appearing in FIG. 3A is an image data portion other than the effective area data of the image data 303 output from the imaging data input interface 111. In general, the ineffective area data 302 is image data in an area, such as an optical black area, which is not written into the medium 107. The ineffective area data 302 is output from the imaging data input interface 111 for use in generating data for correcting errors of values of pixels in the effective area data 300 due to the characteristics of the image pickup device 102.

Figure 3C:
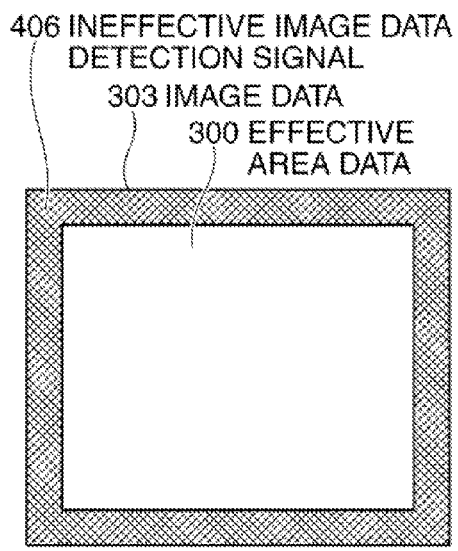
Figure 3B:
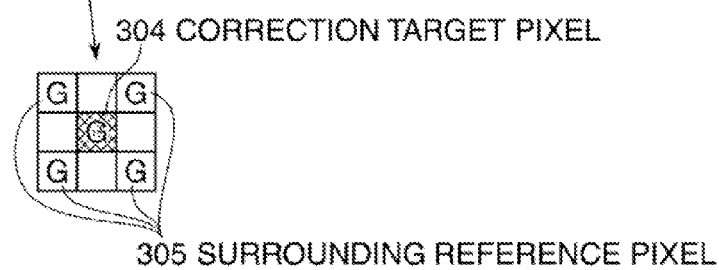

A surrounding reference area 301 appearing in FIG. 3A corresponds to a range of surrounding reference pixels 305, appearing in FIG. 3B, for correcting a correction target pixel 304. In the first embodiment, an area containing 3×3 pixels with the correction target pixel 304 in the center is defined as the surrounding reference area 301.

The correction target pixel 304 is a defective pixel to be corrected based on the surrounding reference pixels 305 appearing in FIG. 3B. The surrounding reference pixels 305 have the same primary color information, described hereinafter, as that of the correction target pixel 304 located in the surrounding reference area 301.

Specifically, in the operation for correcting a defective pixel, the output from the imaging data input interface 111 is scanned within the range of the image data 303. Each correction target pixel 304, which is determined as a defective pixel at this time, is corrected by the defective pixel correction circuit 112.

Figure 4:
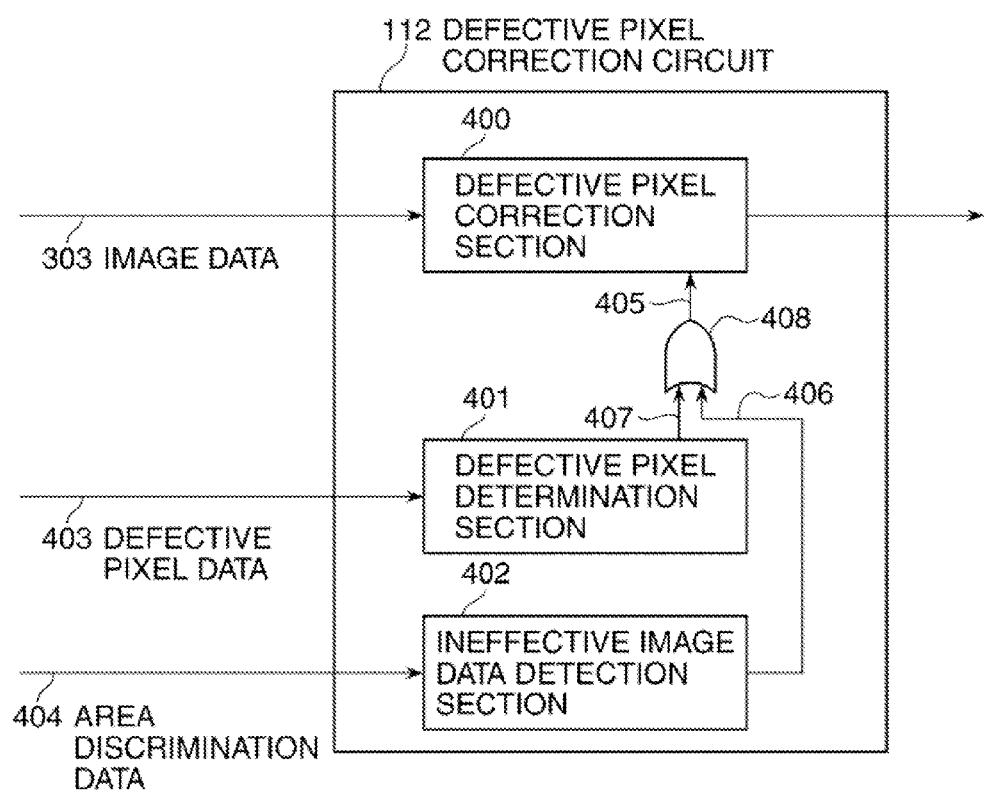
FIG. 4 is a block diagram of a defective pixel correction circuit of the image pickup apparatus according to the first embodiment.

Next, the defective pixel correction circuit 112 will be described in detail with reference to FIG. 4.

The defective pixel correction circuit 112 comprises a defective pixel determination section 401, an ineffective image data detection section 402, and a defective pixel correction section 400.

The ineffective image data detection section 402 of the defective pixel correction circuit 112 detects, based on synchronization signals, not shown, output from the imaging data input interface 111 and the area discrimination data, denoted by a reference numeral 404, whether or not a pixel-associated image data item of the image data 303 belongs to the ineffective area data 302. More specifically, the area discrimination data 404 is data indicative of the respective addresses of pixels corresponding to the ineffective area data 302, and the ineffective image data detection section 402 counts the synchronization signals to thereby identify from which address a pixel-associated image data item of the image data 303 is read out. When the identified address matches the address of a pixel corresponding to the ineffective area data 302, the ineffective image data detection section 402 determines that the pixel-associated image data item of the image data 303 belongs to the ineffective area data 302, to thereby detect a pixel-associated item of the ineffective area data 302. Then, when the pixel-associated item of the ineffective area data 302 is detected, the ineffective image data detection section 402 outputs to an OR circuit 408 a binary ineffective image data detection signal 406 indicating that pixel-associated item of the image data 303 belongs to the ineffective area data 302.

The specific positions of pixels (ineffective image data) associated with the ineffective image data detection signal 406 on a sensor map are as illustrated in FIG. 3C.

The defective pixel determination section 401 of the defective pixel correction circuit 112 determines, based on the synchronization signals, not shown, output from the imaging data input interface 111 and the defective pixel data 403 read out from the DRAM (storage section) 109, whether or not image data (pixel-associated image data item) has been generated from a defective pixel output element. The defective pixel data 403 stores the addresses of the defective pixels, and the defective pixel determination section 401 counts the synchronization signals to thereby identify from which address a pixel-associated image data item of the image data 303 is read out. When the identified address matches the pixel address included in the defective pixel data 403, the defective pixel determination section 401 determines that the pixel-associated image data item of the image data 303 has been output from the defective pixel output element. Then, when it is determined that the pixel-associated image data item of the image data 303 has been output from the defective pixel output element, the defective pixel determination section 401 outputs to the OR circuit 408 a binary defective pixel detection signal 407 indicating that the pixel-associated image data item of the image data 303 has been output from the defective pixel output element.

The OR circuit 408 functions as a signal generation section that delivers a defective pixel determination signal 405 to the defective pixel correction section 400 when at least one of the defective pixel detection signal 407 and the ineffective image data detection signal 406 is input thereto. More specifically, the OR circuit 408 outputs the logical sum of the defective pixel detection signal 407 and the ineffective image data detection signal 406. The defective pixel determination signal 405 is generated as defective pixel determination data (data for defective pixel determination) obtained by superimposing the defective pixel detection signal 407 as a first signal and the ineffective image data detection signal 406 as a second signal. A pixel determined, based on the defective pixel determination signal 405, as either a pixel associated with a defective pixel output element of the image pickup device 102 or a pixel outside the range (effective area associated with the effective area data 300) set in association with the image pickup device 102 will be hereinafter referred to as a determined-as-defective pixel. Image data of the determined-as-defective pixel is converted to a value of the defective pixel determination signal 405. Alternatively, a flag may be added to a pixel-associated image data item from which the defective pixel determination signal 405 is generated, to indicate the fact.

Figure 5A:
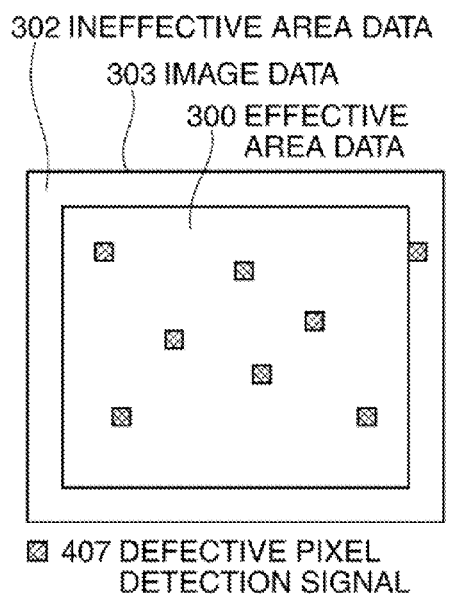
FIGS. 5A, 5B, and 5C are conceptual views useful in explaining determined-as-defective pixels.
Figure 5B:
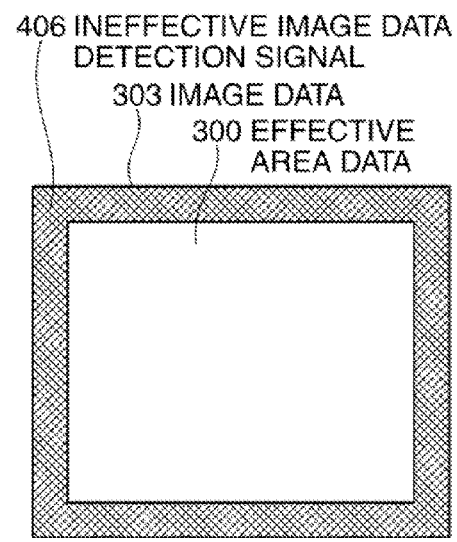
Figure 5C:
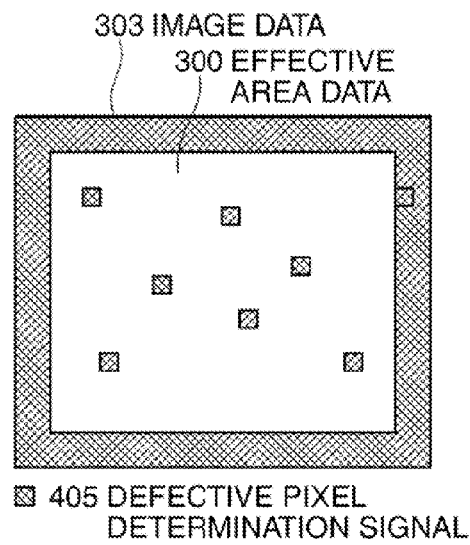

Now, a description will be given, with reference to FIGS. 5A, 5B, and 5C, of the position of a pixel-associated image data item (hereinafter, also simply referred to as a pixel) converted to the defective pixel determination signal 405 on the sensor map. FIG. 5A is a conceptual view illustrating how pixels each associated with the defective pixel detection signal 407 are arranged on the sensor map. FIG. 5B is a conceptual view illustrating how pixels each associated with the ineffective image data detection signal 406 are arranged on the sensor map. FIG. 5C illustrates pixels each associated with the defective pixel determination signal 405, which are obtained by superimposing the pixels illustrated in FIG. 5A on the pixels illustrated in FIG. 5B. In other words, the respective positions of the pixels, appearing in FIG. 5A, each associated with the defective pixel detection signal 407 and those of the pixels, appearing in FIG. 5B, associated with the ineffective image data detection signal 406 are all shown in FIG. 5C.

The defective pixel correction section 400 of the defective pixel correction circuit 112 corrects the image data 303 based on the defective pixel determination signal 405 generated as above, and outputs the corrected image data 303.

Figure 6:
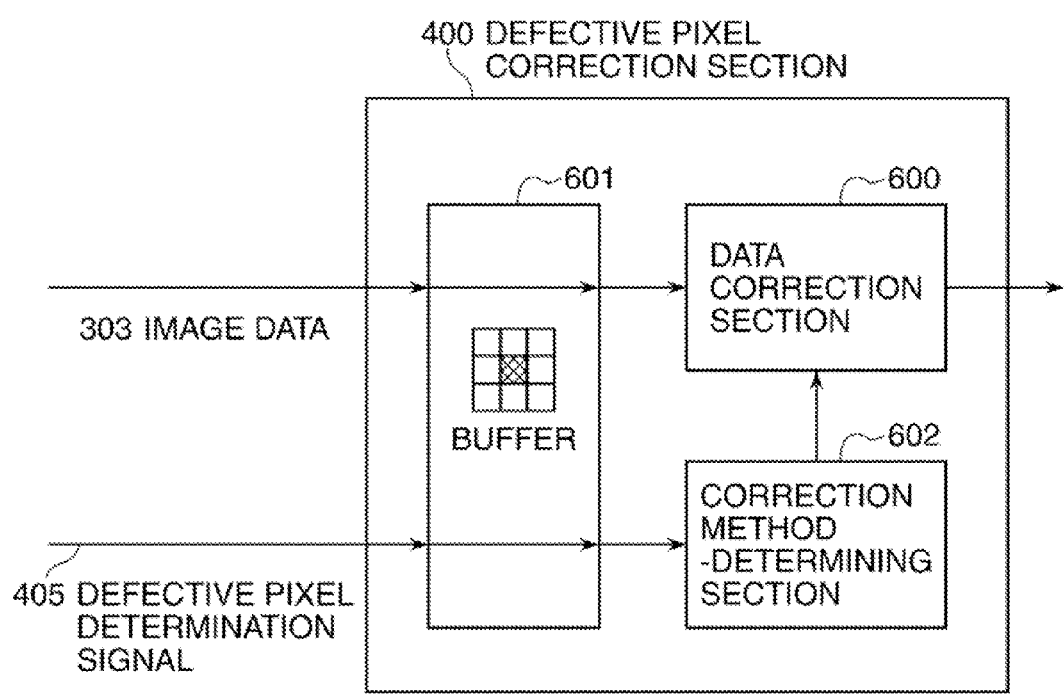
FIG. 6 is a block diagram of a defective pixel correction section of the image pickup apparatus according to the first embodiment.

The defective pixel correction section 400 is configured as shown in FIG. 6. The defective pixel correction section 400 comprises a buffer 601, a data correction section 600, and a correction method-determining section 602.

The buffer 601 is a circuit for storing the image data 303 and data obtained based on the defective pixel determination signal 405, which is used by the data correction section 600 or the correction method-determining section 602, for a two-dimensional filter.

The correction method-determining section 602 of the defective pixel correction section 400 is a block for determining a correction method to be employed by the data correction section 600. The operation of the correction method-determining section 602 for determining the correction method will be described with reference to FIGS. 7(a) to 7(n).

Figures 7A, 7B, 7C, 7D:
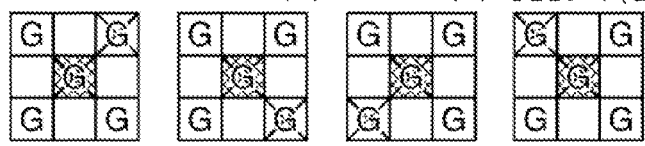
FIGS. 7(a) to 7(n) are schematic views useful in explaining position patterns of defective pixels determined by a correction method-determining section of the image pickup apparatus according to the first embodiment.
Figures 7E, 7F, 7G, 7H, 7I, 7J:
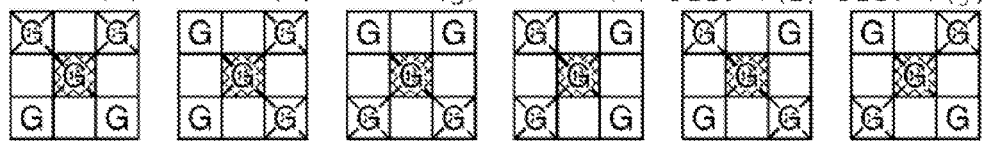
Figures 7K, 7L, 7M, 7N:
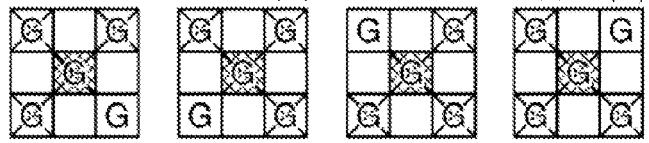

Each mark "X" in FIGS. 7(a) to 7(n) represents a determined-as-defective pixel 500 converted to the defective pixel determination signal. Each determined-as-defective pixel 500 indicates where on the two-dimensional filter the defective pixel determination signal 405 output from the buffer 601 is positioned.

FIGS. 7(a) to 7(n) shows possible patterns of positions of determined-as-defective pixels 500 occurring among the surrounding reference pixels 305. In particular, the determined-as-defective pixels 500 occur at the upper side of FIG. 7(e), the right side of FIG. 7(f), the lower side of FIG. 7(g), the left side of FIG. 7(h), the left and upper sides of FIG. 7(k), the upper and right sides of FIG. 7(l), the right and lower sides of FIG. 7(m), and the lower and left sides of FIG. 7(n). More specifically, these patterns correspond to patterns of surrounding reference pixels 305 each determined by the correction method-determining section 602 as the determined-as-defective pixel 500 in the case where the surrounding reference pixels 305 are pixels of the ineffective area data 302. The patterns illustrated in FIGS. 7(e) to 7(h) correspond to cases where the determined-as-defective pixels 500 correspond to portions of the ineffective area data 302 outside the respective upper, right, lower, and left sides of the effective area data 300, while the patterns illustrated in FIGS. 7(k) to 7(n) correspond to cases where the determined-as-defective pixels 500 correspond to portions of the ineffective area data 302 outside the respective upper left, upper right, lower right, and lower left corners of the effective area data 300.

The correction method-determining section 602 determines the position of each determined-as-defective pixel 500 in one of FIGS. 7(a) to 7(n), and causes the data correction section 600 to perform data correction of the correction target pixel 304. Note that each pixel-associated data item of the image data 303 which is not determined as data of a defective pixel and hence is not set as data of the correction target pixel 304 is not subjected to the data correction.

In the case of performing the data correction, when the determined-as-defective pixel 500 is located in the position of a surrounding reference pixel 305, the correction method-determining section 602 notifies the data correction section 600 of a correction method in which defective pixel correction is performed using only surrounding reference pixels 305 which are not determined-as-defective pixels 500. When receiving this notification, the data correction section 600 determines a two-dimensional filter based on the notification from the correction method-determining section 602, and then performs the data correction to deliver the corrected data.

Thus, in the correction method-determining section 602, the data correction section 600 performs correction using data of pixels which is neither data of defective pixels nor ineffective area data.

As described above, in the defective pixel correction circuit 112 of the image pickup apparatus 100 according to the present embodiment, the ineffective area data 302 is handled as image data of determined-as-defective pixels similarly to image data of defective pixels. This enables the defective pixel correction circuit 112 to perform proper defective pixel correction without generating pseudo reference pixels e.g. by copying image area end data.

Note that although in the present embodiment, the defective pixel determination section 401 generates the defective pixel detection signal 407 based on the defective pixel data 403 read out from the DRAM (storage section) 109, this is not limitative, but the defective pixel determination section 401 may be configured to determine whether or not a target pixel is a defective pixel, based on a result of comparison between the level of the target pixel and those of pixels surrounding the target pixel.

In short, in the first embodiment, the defective pixel determination section 401 outputs the defective pixel detection signal 407 specifying the position of a defective pixel caused by a defective pixel output element included in the image pickup device 102.

At the same time, the ineffective image data detection section 402 detects a pixel-associated image data item of the ineffective area data 302 based on the area discrimination data 404 and outputs the ineffective image data detection signal 406 indicating that the detected data item is a data item of the ineffective area data 302. In the present first embodiment, the specific positions of pixels associated with the ineffective image data detection signal 406 on the sensor map correspond to pixel arrays positioned in the outermost periphery (four sides) of the entire image data 303, as shown in FIG. 3C (the pixel arrays may be a single pixel array). Note that an area of pixels of the ineffective area data 302 is outside the range of an area of pixels of the effective area data 300 which is image data.

Then, the defective pixel detection signal 407 and the ineffective image data detection signal 406 are superimposed one upon the other, whereby the defective pixel determination signal 405 is generated.

In the defective pixel correction section 400, the determined-as-defective pixel 500 identified, out of pixels of image data output from the image pickup device, by the correction method-determining section 602 based on the defective pixel determination signal 405, is subjected to data correction by the data correction section 600.

In the case of performing the data correction, the correction method-determining section 602 of the defective pixel correction section 400 detects whether or not any determined-as-defective pixel 500 is located in the positions of surrounding reference pixels 305. Then, when a determined-as-defective pixel 500 is detected among them, the correction method-determining section 602 notifies the data correction section 600 of the correction method in which defective pixel correction is performed using only data of surrounding reference pixels 305 which are not the determined-as-defective pixels 500.

The data correction section 600 executes signal processing, such as a two-dimensional filtering process, according to the notification from the correction method-determining section 602.

The signal processing including the two-dimensional filtering process is executed only when a defective pixel output element included in the image pickup device 102 is positioned within a range corresponding to the area of pixels of the effective area data 300.

Further, the signal processing including the two-dimensional filtering process is performed using only surrounding reference pixels 305 positioned within a pixel range of the effective area data 300. In the signal processing including the two-dimensional filtering process, if a plurality of surrounding reference pixels 305 are positioned within the pixel range of the effective area data 300, the average value of the surrounding reference pixels 305 can be used, whereas if only a single surrounding reference pixel 305 exists within the pixel range, the value of the single surrounding reference pixel 305 can be used. Alternatively, when a plurality of surrounding reference pixels 305 are positioned within the pixel range of the effective area data 300, it is possible to determine correlations between pixels around the correction target pixel 304 as the center, in a plurality of directions, respectively, and correct the value of the correction target pixel 304 preferentially using pixels positioned in a direction with the highest correlation. Although in the present embodiment, the two-dimensional filter is formed by 3×3 pixels, this is not limitative, but various well-known two-dimensional filters can be employed. For example, it is possible to use a 5×5 pixel filter or a 7×7 pixel filter, i.e. a filter with an increased number of filter taps. Alternatively, it is possible to mix correction values obtained from pixels identical in color and pixels different in color according to the chroma of image data in an area on a two-dimensional filter, instead of using pixels of the same color. Although in the above example, the description is given based on an example of pixels of green (G), it is well known that the correction of the value of a correction target pixel can also be performed for pixels of blue (B) or red (R) by a similar method. Further, a one-dimensional filter configured to refer to the values of pixels positioned in the vertical or horizontal direction with respect to a target pixel may be used in place of the two-dimensional filter.

The filtering process executed as above does not require burdensome processing for extrapolating image area end data to a location where missing reference pixels should exist, to thereby generate pseudo reference pixels. Therefore, according to the first embodiment, it is possible to perform a filter-based correction process speedily and easily.

Next, an image pickup apparatus according to a second embodiment of the present invention will be described with reference to drawings. In the image pickup apparatus of the second embodiment as well, the defective pixel correction circuit 112 superimposes the defective pixel detection signal 407 and the ineffective image data detection signal 406 one upon the other to thereby generate the defective pixel determination signal 405, and the defective pixel correction section 400 corrects input image data based on the defective pixel determination signal 405.

In the following description of the image pickup apparatus of the second embodiment, description of component parts identical to those of the image pickup apparatus of the first embodiment is omitted, and basically, different points from the first embodiment will be described.

Data output from each block included in the digital signal processor 114 of the present image pickup apparatus will be described in detail with reference to FIG. 8.

Figure 8:
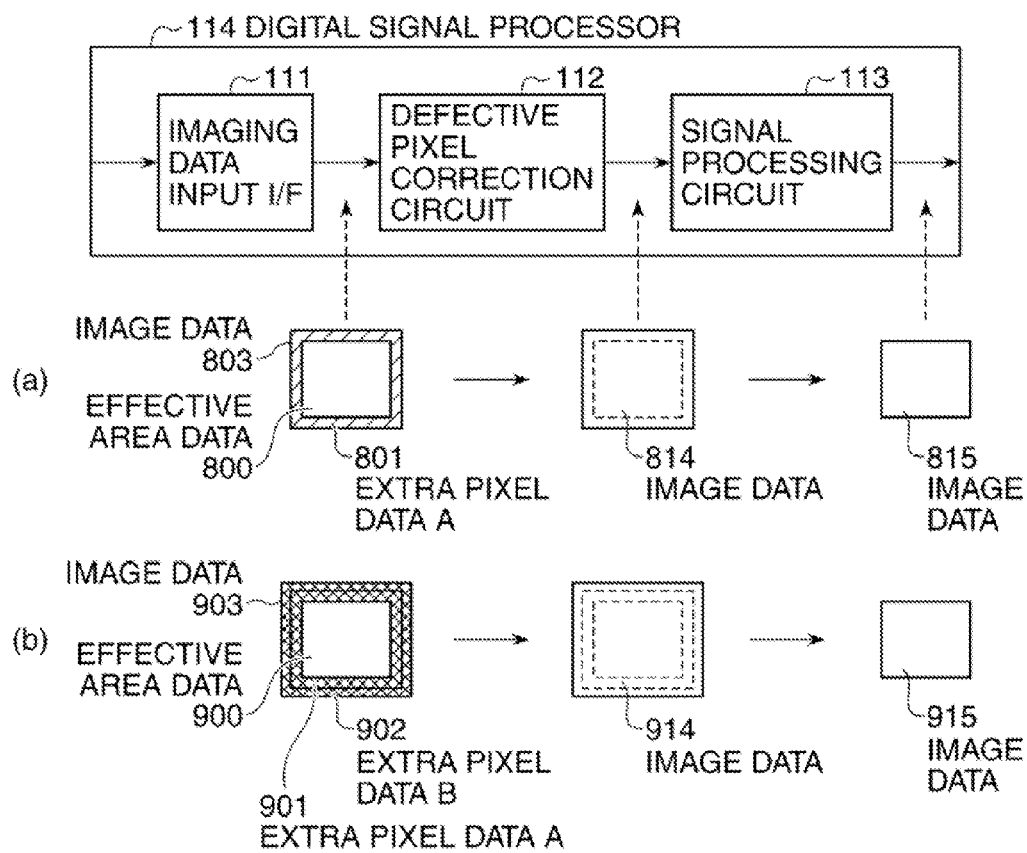
FIG. 8 is a conceptual view useful in explaining outputs from respective blocks within a digital signal processor of an image pickup apparatus according to a second embodiment of the present invention, in which the outputs are each represented by a sensor map.

FIG. 8 illustrates a sensor map by focusing attention on the area of data output from each of the imaging data input interface 111, the defective pixel correction circuit 112, and the signal processing circuit 113 of the digital signal processor 114.

FIG. 8(a) illustrates output data from the digital signal processor 114 of the image pickup apparatus according to the second embodiment. As shown in FIG. 8(a), image data 803 comprises effective area data 800 and extra pixel data A 801. The effective area data 800 is an image area to be recorded in the media. Further, the extra pixel data A 801 in the present embodiment corresponds to the image data referred to as the ineffective area data in the first embodiment, and in the present embodiment, it provides reference pixels for use in arithmetic operation performed on pixels at an end of the image area of the pixels of the effective area data 800. The extra pixel data A 801 is an area for extra data which is referred to during a defective pixel correction process performed on the effective area data 800.

In the present digital signal processor 114, the two-dimensional filter used in the defective pixel correction circuit 112 comprises 3×3 pixels. In the digital signal processor 114, the extra pixel data A is formed as an area vertically and horizontally extended by one pixel from the effective area data 800. Determination as to the extra pixel data A is performed based on area discrimination data output from the imaging data input interface 111.

Next, a detailed description will be given of the operation of the digital signal processor 114 of the image pickup apparatus according to the second embodiment. It is assumed that the image pickup apparatus of the second embodiment is configured to perform raster-reading of image data. More specifically, in succession to image data of the last pixel of one line, the image pickup apparatus reads out image data of the first pixel of the next line.

In the digital signal processor 114, image data 803 is output from the imaging data input interface 111 to the defective pixel correction circuit 112. Then, the defective pixel correction circuit 112 handles a pixel-associated image data item of the extra pixel data A 801 of the input image data 803 as a determined-as-defective pixel, to thereby perform a defective pixel correction process using a two-dimensional filter, without necessitating a circuit for copying pixels at an end of the image area. Then, the defective pixel correction circuit 112 outputs effective area data 802 generated by the defective pixel correction process to the signal processing circuit 113.

Figure 9:
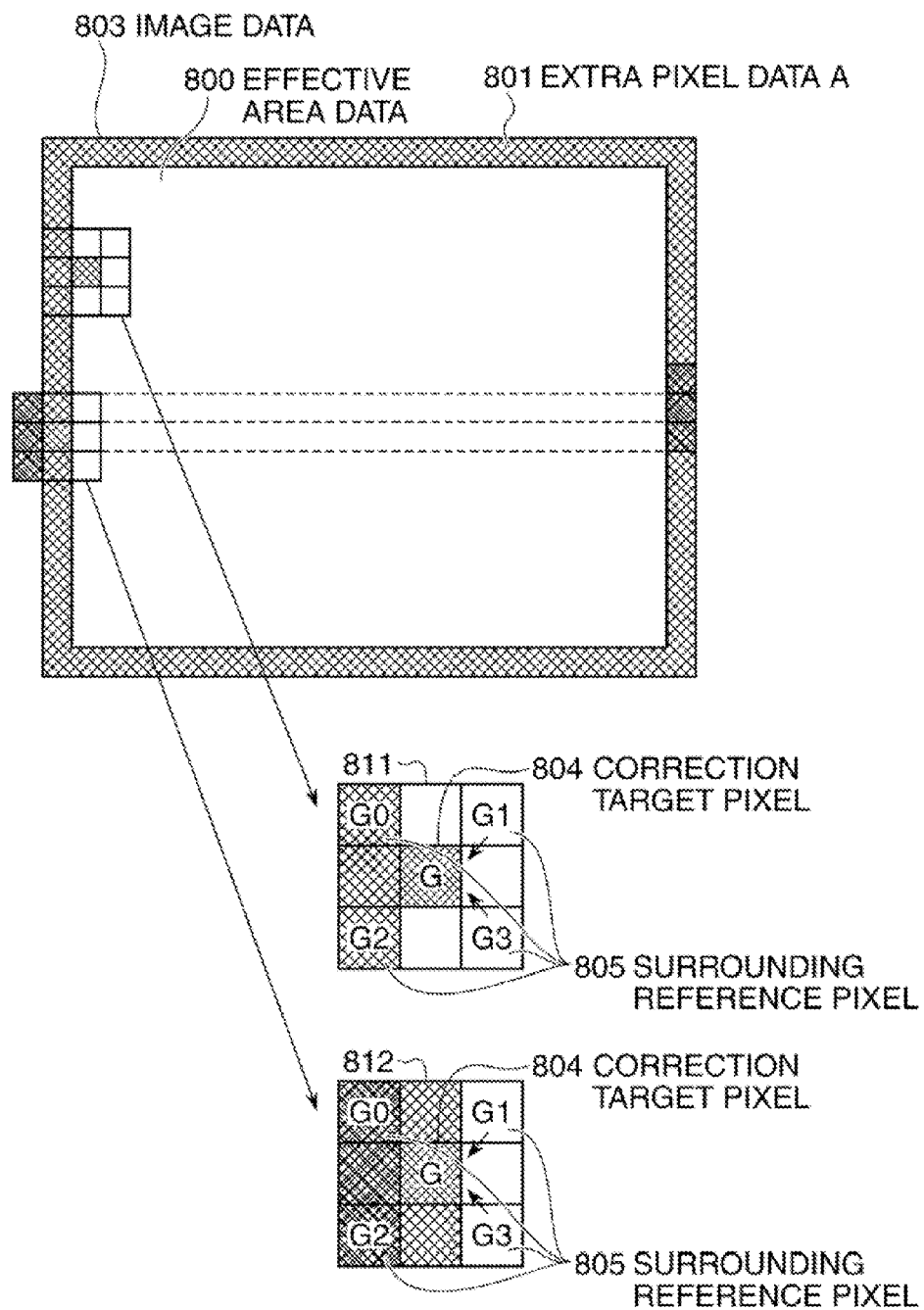
FIG. 9 is a sensor map used by the image pickup apparatus according to the second embodiment in which respective positions thereon of two-dimensional filters are indicated.

FIG. 9 illustrates a state where during processing by the defective pixel correction circuit 112, positions of surrounding reference pixels 805 (reference area) of a two-dimensional filter are located in an end of image data. Same-color pixels G0 to G3 positioned around a correction target pixel 804 are surrounding reference pixels 805. In FIG. 9, a reference numeral 811 denotes a state of the pixels of a two-dimensional filter with the correction target pixel 804 existing in the range of the effective area data 800 and some surrounding reference pixels 805 existing in the area of the extra pixel data A 801. In this state, the pixels G0 and G2 of the surrounding reference pixels 805 are located in the area of the extra pixel data A 801, and therefore the defective pixel correction circuit 112 regards the data of the surrounding reference pixels G0 and G2 as the data of determined-as-defective pixels and corrects the correction target pixel 804 based on the data of surrounding reference pixels G1 and G3. Of course, when one of the surrounding reference pixels G1 and G3 is a defective pixel and is handled as a determined-as-defective pixel, the data of the pixel is not used for correction of the correction target pixel 804.

In FIG. 9, a reference numeral 812 denotes a state of the pixels of a two-dimensional filter with a correction target pixel 804 existing in the area of the extra pixel data A 901 and some surrounding reference pixels 805 apparently existing outside the output range of the image data 803 when viewed in FIG. 9.

As mentioned hereinabove, in the second embodiment, the image pickup apparatus is configured to perform raster-reading of image data. For this reason, the surrounding reference pixel G2 in the filter 812 corresponds to the last pixel of a line containing the correction target pixel 804, and the surrounding reference pixel G0 corresponds to the last pixel of an immediately preceding (upper) line of the line containing the surrounding reference pixel G1. Since the pixels G0 and G2 of the surrounding reference pixels 805 are in the area of the extra pixel data A 801, the defective pixel correction circuit 112 regards the surrounding reference pixels G0 and G2 as determined-as-defective pixels and converts the value of the correction target pixel 804 to the average value of the surrounding reference pixels G1 and G3.

In the second embodiment, the use of a two-dimensional filter makes it possible to convert the value of any pixel existing in the area of the extra pixel data A 801 to a value calculated only from image data existing in the range of the effective area data 800. This enables generation of image data that can be regarded as having the entire extra pixel data A 801 converted to the effective area data. Thus, image data 814 having its effective area data eventually extended two-dimensionally by one pixel, as illustrated in FIG. 8(a), is output from the defective pixel correction circuit 112, and the image data 814 is input to the signal processing circuit 113. In the case of performing the noise reduction process e.g. using a two-dimensional filter, the signal processing circuit 113 can use the image data 814 having its effective area data extended from that of the image data 803. More specifically, the signal processing circuit 113 can consider the image data 814 to be image data having pseudo reference pixels added to the outside of the effective area data 800, and thereby generate image data having undergone the noise reduction process. The signal processing circuit 113 cuts out an area corresponding to the effective area data 800 from image data subjected to a plurality of processes for signal processing, and outputs the area as image data 815.

Referring to FIG. 8(b), image data 903 comprises effective area data 900, extra pixel data A 901, and extra pixel data B 902.

The effective area data 900 and the extra pixel data A 901 are identical to the effective area data 800 and the extra pixel data A 801 in FIG. 8(a), respectively. The extra pixel data B 902 is formed by extra pixel arrays added to the vertical and horizontal sides of the extra pixel data A 901, respectively.

In an example described hereinafter with reference to FIG. 10 and the FIG. 8(b), it is assumed that a two-dimensional filter used in the defective pixel correction circuit 112 is formed by 5×5 pixels. In the digital signal processor 114, an area obtained by superimposing the extra pixel data A 901 and the extra pixel data B 902 one upon the other is extended vertically and horizontally from the effective area data 800 by two pixels. These pixels are determined based on area discrimination data output from the imaging data input interface 111.

Next, a detailed description will be given of the operation of the digital signal processor 114 of the image pickup apparatus according to the second embodiment.

In the digital signal processor 114, the imaging data input interface 111 outputs the image data 903 to the defective pixel correction circuit 112. Then, the defective pixel correction circuit 112 performs defective pixel correction while handling pixels of the extra pixel data A 901 and the extra pixel data B 902 as determined-as-defective pixels, and outputs image data 914 generated through the defective pixel correction to the signal processing circuit 113.

Figure 10:
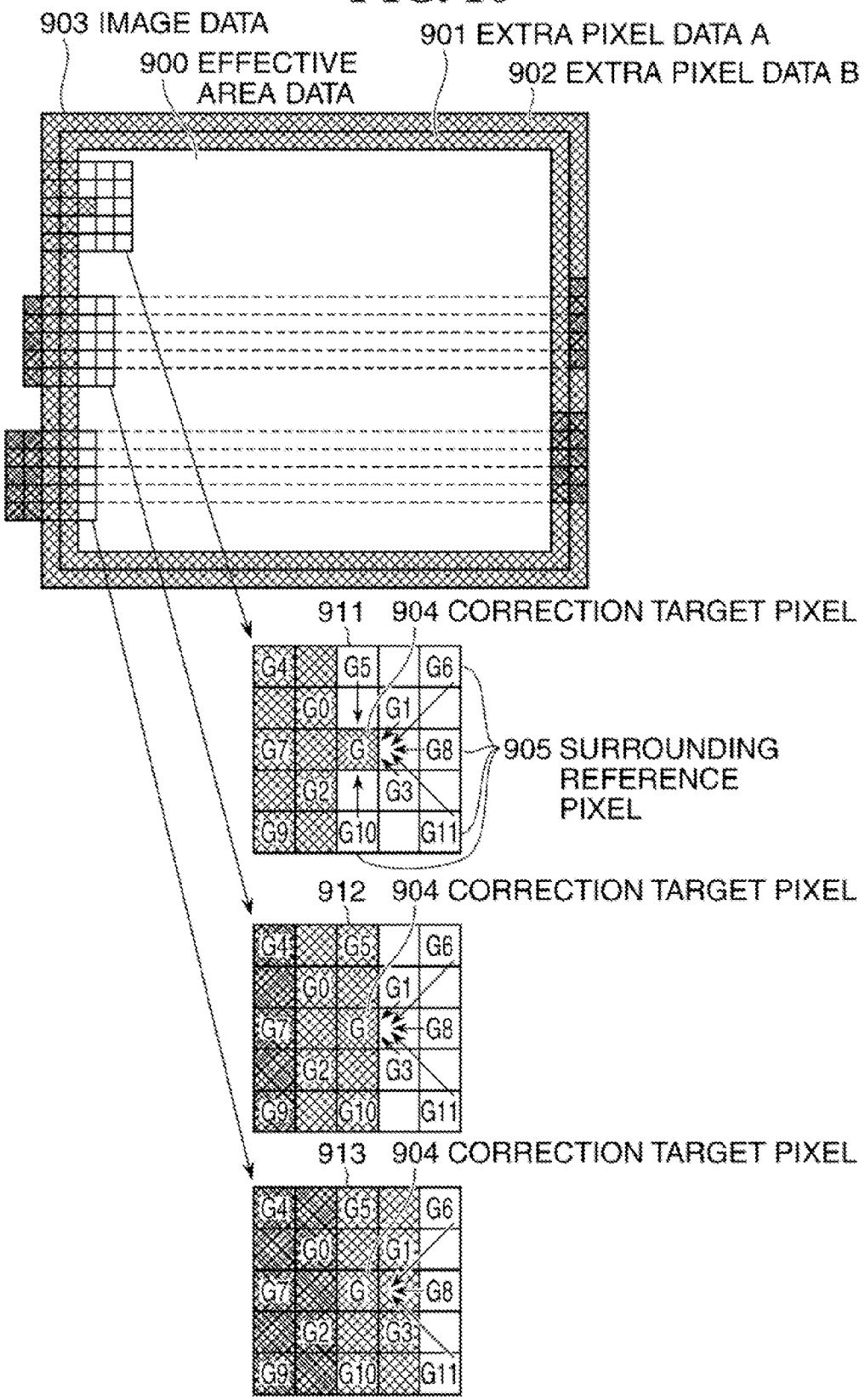
FIG. 10 is a sensor map used by the image pickup apparatus according to the second embodiment in which respective positions thereon of two-dimensional filters of another type are indicated.

FIG. 10 illustrates a state where during processing by the defective pixel correction circuit 112, positions of surrounding reference pixels 805 (reference area) of a two-dimensional filter are located in an end of image data. Same-color pixels positioned around a correction target pixel 904 are surrounding reference pixels 905 (G0 to G11). In FIG. 10, a reference numeral 911 denotes a state of the pixels of the two-dimensional filter with a correction target pixel 904 existing in the range of the effective area data 900 and some of the surrounding reference pixels 905 existing in the area of the extra pixel data A 901. In this state, the surrounding reference pixels G0, G2, G4, G7, and G9 are pixels of the extra pixel data A 901 or the extra pixel data B 902, and therefore the defective pixel correction circuit 112 regards data of the surrounding reference pixels G0, G2, G4, G7, and G9 as data of determined-as-defective pixels and corrects the correction target pixel 904 based on the other surrounding reference pixels G1, G3, G5, G6, G8, G10, and G11. For example, a correction value for the correction target pixel 904 can be calculated by weighted averaging of the values of these surrounding reference pixels while assigning a larger weight to surrounding reference pixels closer to the correction target pixel 904.

In FIG. 10, a reference numeral 912 denotes a state of the pixels of the two-dimensional filter with the correction target pixel 904 existing in the area of the extra pixel data A 901 and some surrounding reference pixels 905 apparently existing outside the output range of the image data 903 when viewed in FIG. 10. In the second embodiment, since the image pickup apparatus is configured to perform raster-reading of the image data 903, each of the surrounding reference pixels G4, G7, and G9 corresponds to the last pixel of an associated one of immediately preceding lines including the surrounding reference pixels G6, G8, and G11, respectively. In this state, the defective pixel correction circuit 112 converts the value of the correction target pixel 904 to the average value of the surrounding reference pixels G1, G3, G6, G8, and G11 which are not associated with the extra pixel data A 901 or the extra pixel data B 902.

In FIG. 10, a reference numeral 913 denotes a state of the pixels of the two-dimensional filter with the correction target pixel 904 existing in the area of the extra pixel data B 902 and some of the surrounding reference pixels 905 apparently existing outside the output range of the image data 903 when viewed in FIG. 10. In this state, the defective pixel correction circuit 112 converts the value of the correction target pixel 904 to the average value of the surrounding reference pixels G6, G8, and G11 which are not associated with the extra pixel data A 901 or the extra pixel data B 902.

As described above, in the second embodiment, by using the two-dimensional filter, it is possible to convert the value of a correction target pixel 904 to a value calculated only from pixel-associated image data items of the effective area data 900, whether the correction target pixel 904 may be associated with either the extra pixel data A 901 or the extra pixel data B 902. This enables generation of image data that can be regarded as having the entire extra pixel data A 901 and extra pixel data B 902 converted to the effective area data. Thus, image data 914 having its effective area data eventually extended two-dimensionally by two pixels is output from the defective pixel correction circuit 112, and the image data 914 is input to the signal processing circuit 113. This enables the signal processing circuit 113 to perform a noise reduction process by using the image data 914 having its effective area data extended from that of the image data 903. The signal processing circuit 113 cuts out an area corresponding to the effective area data 900 from image data subjected to a plurality of processes for signal processing, and outputs the area as image data 915.

As described above, in the second embodiment, the defective pixel correction circuit 112 of the digital signal processor 114 is capable of generating image data having its effective area extended and outputting the same to the signal processing circuit 113 at the following stage. As can be understood from a comparison between FIGS. 9 and 10, as the two-dimensional filter used by the defective pixel correction circuit 112 has the reference area thereof more expanded, it is possible to generate image data having a larger area of the extra pixel data converted to effective area data. In other words, as the two-dimensional filter used by the defective pixel correction circuit 112 has the reference area thereof more expanded, it is possible to cause the signal processing circuit 113 at the following stage to perform a filtering process with a larger reference area.

In short, in the second embodiment, the image data 903 output from the imaging data input interface 111 comprises the effective area data 900 and the extra pixel data. The effective area data 900 is the data of an image area recorded in the media.

In the digital signal processor 114 in the second embodiment, the area of the extra pixel data is formed in a manner two-dimensionally extending outward from the effective area data 900 by one or more pixels, and determination whether a pixel is associated with a data item of the extra pixel data is performed based on the area discrimination data output from the imaging data input interface 111.

In the defective pixel correction circuit 112 in the second embodiment, similarly to the first embodiment, the defective pixel detection signal 407 and the ineffective image data detection signal 406 are superimposed one upon the other, whereby the defective pixel determination signal 405 is generated.

The defective pixel correction circuit 112 performs data correction on a determined-as-defective pixel identified by the correction method-determining section, in response to the defective pixel determination signal 405. In the data correction process, when surrounding reference pixels exist in the area of the extra pixel data, the defective pixel correction circuit 112 handles the surrounding reference pixels as determined-as-defective pixels.

Further, in the data correction process, even when a correction target pixel is in the area of the extra pixel data, the value of the correction target pixel is corrected by the two-dimensional filtering process, utilizing only values obtained from surrounding reference pixels 305 positioned within the range of effective area data. In this case, as the area referred to by the two-dimensional filter is expanded, it is possible to further expand a range where values of extra pixels are corrected to the values obtained from pixel-associated data items of the effective area data. Of course, in place of a two-dimensional filter, it is possible to use a one-dimensional filter that refers to the values of pixels positioned in one of the vertical and horizontal directions. Thus, the signal processing circuit 113 at the following stage receives image data with an increased effective area and performs signal processing thereon, so that the signal processing, such as a noise reduction process, is no longer required to generate pseudo reference pixels at an end of the area of the effective area data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-235649 filed Oct. 20, 2010, which is hereby incorporated by reference herein in its entirety.

What is claimed is:

1. An image processing apparatus comprising:
an acquisition unit configured to capture image data including effective area data read out from pixel output elements within a preset range of an image pickup device and ineffective area data read out from pixel output elements outside the preset range of the image pickup device, for correction of a value of a pixel of the effective area data wherein the image pickup device includes a defective pixel output element;
a signal generation unit configured to superimpose a first signal indicative of a position of the defective pixel output element of the image pickup device and a second signal indicative of a position of each of the pixels outside the preset range of the image pickup device, to thereby generate a defective pixel determination signal indicative of a position of a determined-as-defective pixel; and
a correction unit configured to be operable when a target pixel in the image data is determined as the determined-as-defective pixel based on the defective pixel determination signal, to correct a value of the target pixel in the image data, using values of the image data associated with ones of pixels positioned around the target pixel, the ones being each not determined based on the defective pixel determination signal as the determined-as-defective pixel.

2. The image processing apparatus according to claim 1, wherein when the target pixel determined as the determined-as-defective pixel is one of the pixels outside the preset range of the image pickup device, said correction unit corrects the value of the target pixel in the image data using values of the image data associated with ones of pixels positioned around the target pixel and within the preset range of the image pickup device, the ones being each not determined based on the defective pixel determination signal as the determined-as-defective pixel.

3. The image processing apparatus according to claim 2, further comprising a signal processing unit configured to perform a filtering process for noise reduction on image data corrected by said correction unit.

4. The image processing apparatus according to claim 1, wherein said signal generation unit determines, on a pixel-by-pixel basis, whether or not each pixel is a pixel associated with the defective pixel output element of the image pickup device, to thereby generate the first signal, and whether or not the pixel is one of the pixels outside the preset range of the image pickup device, to thereby generate the second signal, and calculates a logical sum of the first signal and the second signal, to thereby generate the defective pixel determination signal.

5. A method of processing an image output from an image pickup device including a defective pixel output element, comprising:
capturing image data including effective area data read out from pixel output elements within a preset range of the image pickup device, and ineffective area data read out from pixel output elements outside the preset range of the image pickup device, for correction of a value of a pixel of the effective area data;
superimposing a first signal indicative of a position of the defective pixel output element of the image pickup device and a second signal indicative of a position of each of the pixels outside the preset range of the image pickup device, to thereby generate a defective pixel determination signal indicative of a position of a determined-as-defective pixel; and
correcting, when a target pixel in the image data is determined as the determined-as-defective pixel based on the defective pixel determination signal, a value of the target pixel in the image data, using values of the image data associated with ones of pixels positioned around the target pixel, the ones being each not determined based on the defective pixel determination signal as the determined-as-defective pixel.

6. An image processing apparatus according to claim 1, wherein the signal generation unit generates the defective pixel determination signal by outputting the logical sum of the first signal and the second signal.

7. An image pickup apparatus comprising:
an image pickup device;
an acquisition unit configured to capture image data including effective area data read out from pixel output elements within a preset range of the image pickup device and ineffective area data read out from pixel output elements outside the preset range of the image pickup device, for correction of a value of a pixel of the effective area data wherein the image pickup device includes a defective pixel output element;
a signal generation unit configured to superimpose a first signal indicative of a position of the defective pixel output element of the image pickup device and a second signal indicative of a position of each of the pixels outside the preset range of the image pickup device, to thereby generate a defective pixel determination signal indicative of a position of a determined-as-defective pixel; and
a correction unit configured to be operable when a target pixel in the image data is determined as the determined-as-defective pixel based on the defective pixel determination signal, to correct a value of the target pixel in the image data, using values of the image data associated with ones of pixels positioned around the target pixel, the ones being each not determined based on the defective pixel determination signal as the determined-as-defective pixel.

* * * * *